US012342798B2

(12) United States Patent
Fischer et al.

(10) Patent No.: US 12,342,798 B2
(45) Date of Patent: Jul. 1, 2025

(54) AQUACULTURE SYSTEM

(71) Applicant: BLOOM-FREA AQUA IP PTE. LTD, Singapore (SG)

(72) Inventors: Ran Fischer, Givat Ela (IL); Christian Ravn Joergensen, Kibaek (DK)

(73) Assignee: Aquagenesis Pte Ltd, Singapore (SG)

(*) Notice: Subject to any disclaimer, the term of this patent is extended or adjusted under 35 U.S.C. 154(b) by 313 days.

(21) Appl. No.: 18/023,388

(22) PCT Filed: Aug. 30, 2021

(86) PCT No.: PCT/IB2021/057900
§ 371 (c)(1),
(2) Date: Feb. 27, 2023

(87) PCT Pub. No.: WO2022/043953
PCT Pub. Date: Mar. 3, 2022

(65) Prior Publication Data
US 2023/0354786 A1    Nov. 9, 2023

Related U.S. Application Data

(60) Provisional application No. 63/072,554, filed on Aug. 31, 2020.

(51) Int. Cl.
*A01K 63/00* (2017.01)
*A01K 61/59* (2017.01)
*A01K 63/04* (2006.01)

(52) U.S. Cl.
CPC ............ *A01K 63/003* (2013.01); *A01K 61/59* (2017.01); *A01K 63/042* (2013.01); *A01K 63/045* (2013.01); *A01K 63/047* (2013.01)

(58) Field of Classification Search
CPC .. A01K 63/047; A01K 63/045; A01K 63/042; A01K 63/04; A01K 63/003; A01K 63/00; A01K 61/50; A01K 61/59; C02F 1/008; C02F 1/72; C02F 1/20; C02F 2209/42; C02F 3/08; C02F 3/043; C02F 3/04; C02F 3/006; C02F 3/005
See application file for complete search history.

(56) References Cited

U.S. PATENT DOCUMENTS

| | | | |
|---|---|---|---|
| 5,593,574 A | 1/1997 | VanToever | |
| 8,506,811 B2* | 8/2013 | Bradley | ............... C02F 1/74 |
| | | | 210/167.22 |
| 9,021,987 B1 | 5/2015 | Myers | |

FOREIGN PATENT DOCUMENTS

| | | |
|---|---|---|
| CN | 204599025 U | 9/2015 |
| CN | 107459226 | 12/2017 |
| KR | 20200055226 A | 5/2020 |
| WO | 2005/075366 | 8/2005 |
| WO | 2019/180615 | 9/2019 |

* cited by examiner

*Primary Examiner* — Peter M Poon
*Assistant Examiner* — Carly W. Lynch
(74) *Attorney, Agent, or Firm* — The Law Office of Joseph L. Felber

(57) ABSTRACT

An aquaculture system (10) comprising growing modules (GM) and liquid treatment modules (LTM). Each growing module is associated via a network of pipes (101, 201, 202) with a respective liquid treatment module to form a pair (161, 162), wherein if liquid flow through a given pair (161, 162) is stopped and left to settle, liquid within the given pair (161, 162) is arranged to balance out to the same level.

20 Claims, 15 Drawing Sheets

AQUACULTURE SYSTEM

TECHNICAL FIELD

Embodiments of the invention relate to an aquaculture system, in particular for farming a variety of species such as crustaceans.

BACKGROUND

Farming of organisms such as fish, or the like is typically known as aquaculture. This farming technique typically includes breeding organisms under controlled conditions as opposed e.g. to commercial fishing where organisms such as fish are harvested in their natural habitat.

U.S. Pat. No. 6,499,431 describes an indoor automatic aquaculture system that has a breeding pond constructed in a stepwise manner for breeding aquatic or marine products in a staged-breeding approach to increase breeding density and reduce required space. Breeding water is processed in advance by a recirculating water treatment system and water quality is constantly monitored by a water quality monitor and control system to maintain the breeding water at the optimum condition.

Shrimp farming is one example of aquaculture where technical improvements have resulted in production of higher densities per unit area of marketable size shrimps that are then distributed to markets around the world.

SUMMARY

The following embodiments and aspects thereof are described and illustrated in conjunction with systems, tools and methods which are meant to be exemplary and illustrative, not limiting in scope.

In an aspect of the present invention there is provided an embodiment of an aquaculture system.

In an embodiment the aquaculture system may be a substantially indoor System.

Possibly, the various systems embodiment may be suited, for farming a variety of species such as crustaceans, for example L vannamei shrimps.

In certain embodiments the aquaculture system of the present invention may include the main components of a 'Liquid Treatment Module' (LTM) and a 'Growing Module' (GM) that are interconnected by pipes.

Possibly, at least certain aquaculture system embodiments may be at least partially divided into sub-systems, where each such sub-system may comprise a 'Liquid Treatment Module' (LTM) and a 'Growing Module' (GM) that are interconnected by a network of pipes.

In certain embodiments, a network of pipes interconnecting a LTM and a GM can facilitate flow of liquid from the GM towards the LTM and/or flow of treated liquid back from the LTM towards the GM, and/or controlled drainage of liquid away from a specific tank of the GM. Liquid as used herein may typically refer to water and supplements used in specifies growth.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
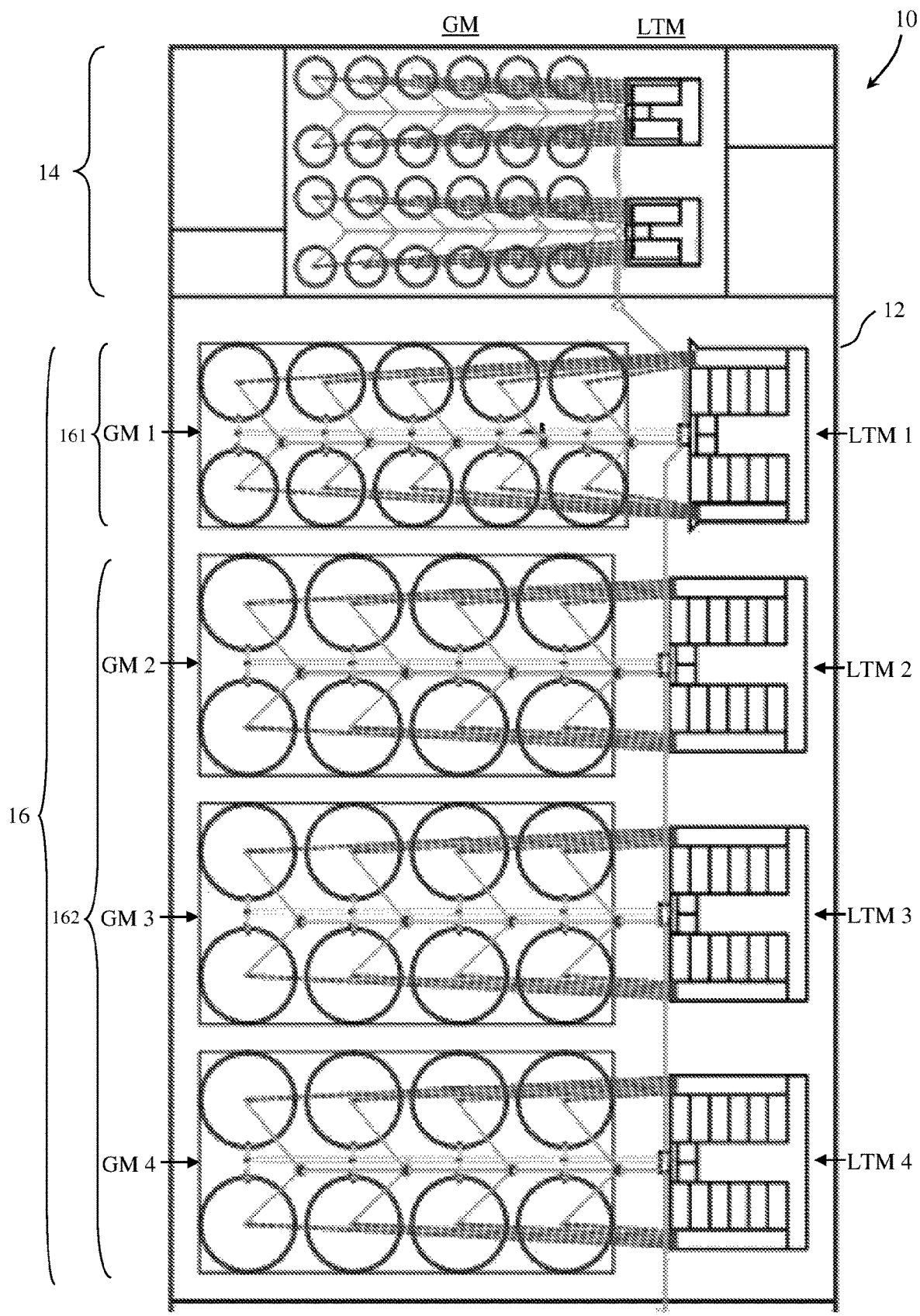
FIG. 1 schematically shows an aquaculture system in accordance with an embodiment of the present invention including growing modules (GM's) and liquid treatment modules (LTM's)

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 schematically illustrating an aquaculture system 10 in accordance with an embodiment of the present invention. Aquaculture system 10 is typically an indoor system housed within a dwelling 12 that substantially separates the aquaculture system from the ambient environment. The aquaculture system disclosed herein may be used for farming a variety of organisms, such as crustaceans (or the like). In one example, aquaculture system may be used for growing shrimps such as L vannamei shrimps.

Aquaculture system 10 may include an optional nursery section 14 and a main farming section 16. In this example, nursery section 14 is shown immediately adjacent a dwelling structure of the framing section 16, however nursery may also be located in a separate dwelling while preferably being still in proximity to the farming section. In some cases, organisms in a suitable growth stage for the farming section may be supplied to the farming section instead of provision of a nursery section as part of aquaculture system 10.

In an example of an aquaculture system suited for growing shrimps, nursery section 14 may be used for nurturing organisms until they typically reach a post-larvae PL (12) growth stage ready for stocking into the farming section. Nursery section 14 as seen in this example includes a liquid treatment module (LTM) and a growing module (GM) that are interconnected by a network of pipes.

Throughout the present disclosure, a non-binding example will be provided for an aquaculture system 10 suited for about 250 MT (metric tonnes) of shrimp production per annum. Through this non-binding example, non-binding dimensions and volumes/sizes of elements of such a system may be exemplified for general reference only, while taking into consideration that other sized systems may be chosen to provide suitable farming conditions according to various embodiments.

In accordance with the non-binding example, organisms in post-larvae (PL) stage stocked into the nursery system may remain in nursery section 14 for about four weeks until they reach e.g. a weight of less than about 1 gram (g). Growing tanks within the growing module (GM) of section 14 in this example are substantially separated from growing tanks in farming section 16, and the accumulated volume of liquid in these tanks in nursery section 14 may be approximately 330 cubic meters. The volume of liquid in nursery section 14 including that in its liquid treatment module (LTM) may amount to approximately 420 cubic meters.

The farming section 16 of aquaculture system 10 includes in this embodiment, several growing modules (GM's) and liquid treatment modules (LTM's). Each growing module (GM) in this example is paired with a respective liquid treatment module (LTM), to form in this example four such pairs (i.e. GM1+LTM1; GM2+LTM2; GM3+LTM3; GM4+LTM4) where each pair can be interconnected by a network of pipes.

In this example, farming section 16 is divided into first and second segments 161, 162. First segment 161 being formed in this example from the pair of GM1+LTM1, and second segment 162 in this example being formed from the three pairs of GM2+LTM2; GM3+LTM3; and GM4+LTM4.

First segment 161 may be arranged for receiving organisms from nursery section 14 in substantially the PL (12) growth stage. The organisms arriving from section 14 may be graded according to average similar criteria, such as size, prior to entering tanks in GM1 of section 161. Within segment 161 a second phase of growth may be executed e.g. for a time span of about another four weeks during which the organisms grow to about 4 g in weight.

According to the non-binding example, the accumulated volume of liquid in growing tanks within GM1 of section 161 may be approximately 760 cubic meters (e.g. ten tanks of about 95 cubic meter each). The volume of liquid in section 161 including that in its liquid treatment module (LTM1) may amount to approximately 1050 cubic meters.

Within second segment 162 of farming section in this example, a third phase of farming of the organisms may take place, during which the organisms reach final stages(s) suitable for marketing. In the non-binding example, such final condition(s) may be defined according to various criteria, such as weight, for example 16 gr, 20 gr and/or 25 gr (or the like). The organisms, e.g. shrimp, may be expected to stay in segment 161 for about 12 weeks (or the like).

Figure 7A:
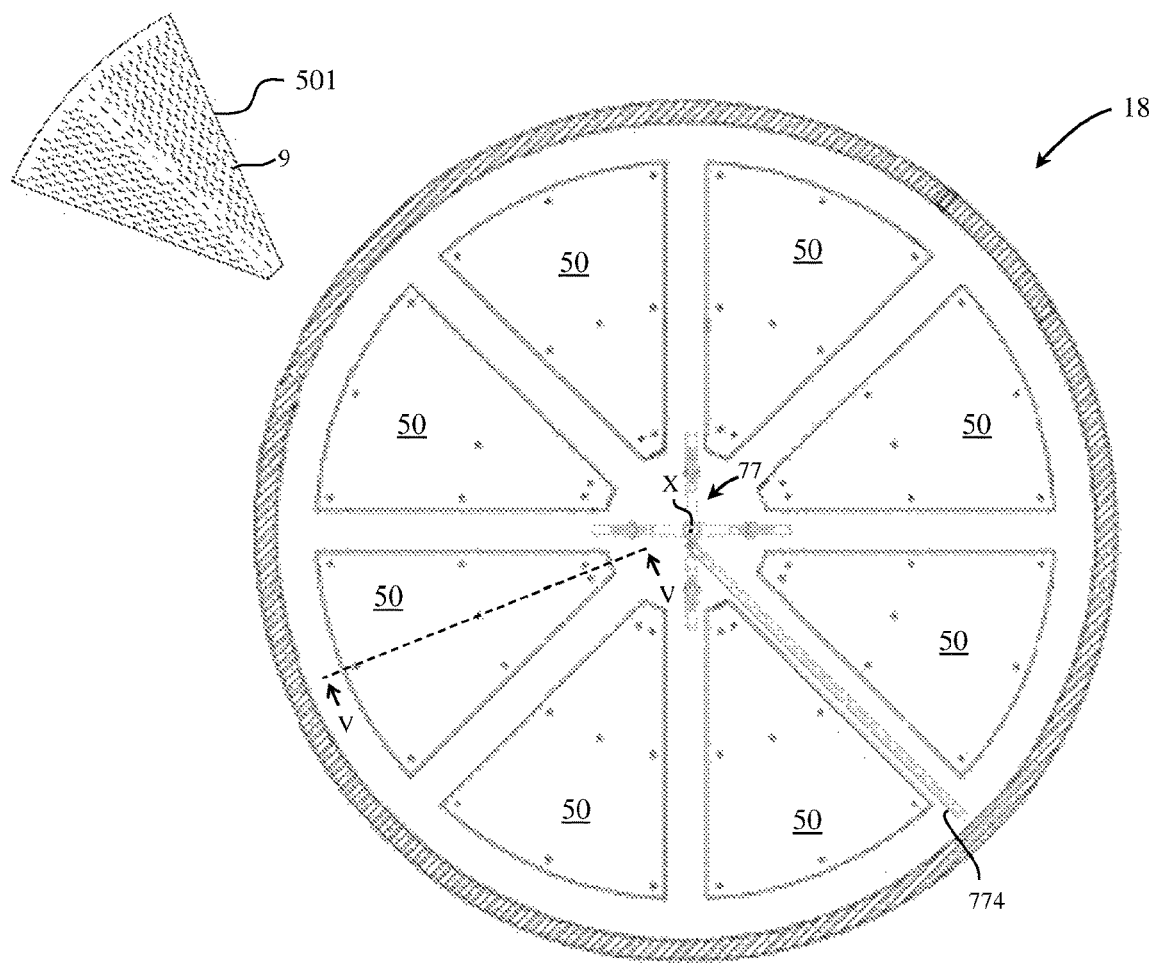
FIGS. 7A and 7B schematically show an embodiment of a growing tank housing therein a vertical growing stack typically used for organism growth to maturity according to an embodiment of the present invention.
Figure 7B:
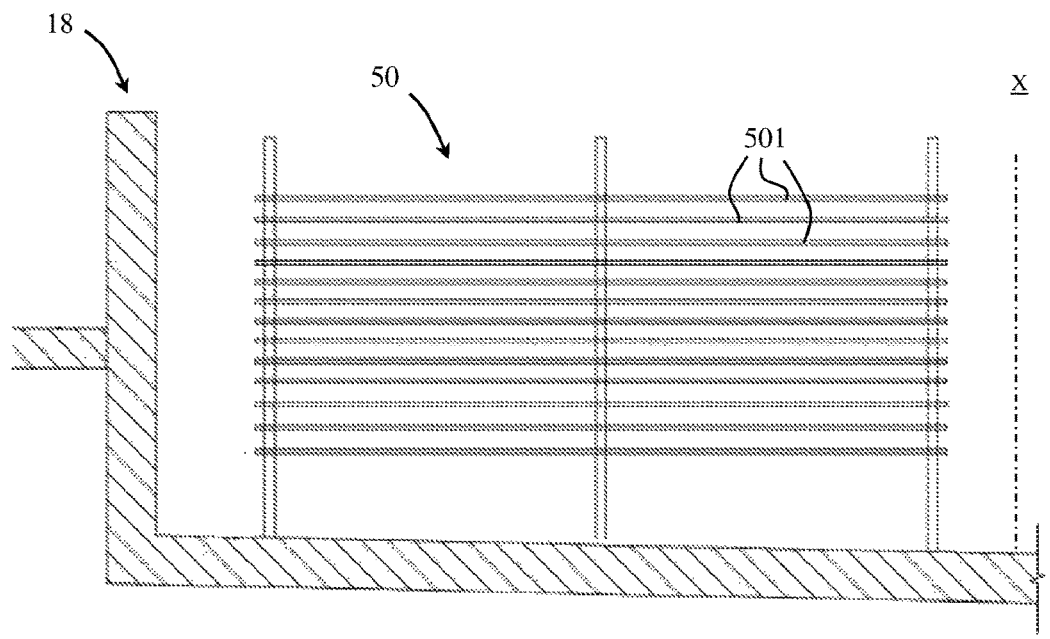

Attention is drawn to FIGS. 7A and 7B providing respective top and partial cross sectional views of a growing tank 18 within a growing module (GM) according to an embodiment of the present invention. The partial cross sectional view of FIG. 7B represents a cross section taken along plane V-V in FIG. 7A, which passes also through a vertical growing stack 50 according to an embodiment of the present invention.

Growing stacks 50 as seen in the top view of FIG. 7A may be distributed, here in a possible symmetrical manner, about a central axis X of the growing tank. The growing stacks can also be seen in the top view of this example as having each an optional generally circular sector shape that can be chamfered at its tip most proximal to axis X when located in the growing tank.

Each growing stack 50 here includes a plurality of shelves 501 stacked one on top of the other. Provision of such vertical growing stacks 50 thus increases the overall surface area within a growing tank for organism growth.

Growing tank 18 in certain embodiments, as seen in FIG. 7A, may be provided with a central hub 77 here generally formed about axis X. Hub 77 includes several service pipes as will be seen and described in more detail with respect to FIG. 5. In addition, as shown in the upper left-hand side of FIG. 7A, shelves 501 within a growing stack may be provided with apertures 9 providing liquid flow between the shelves.

Figure 3:
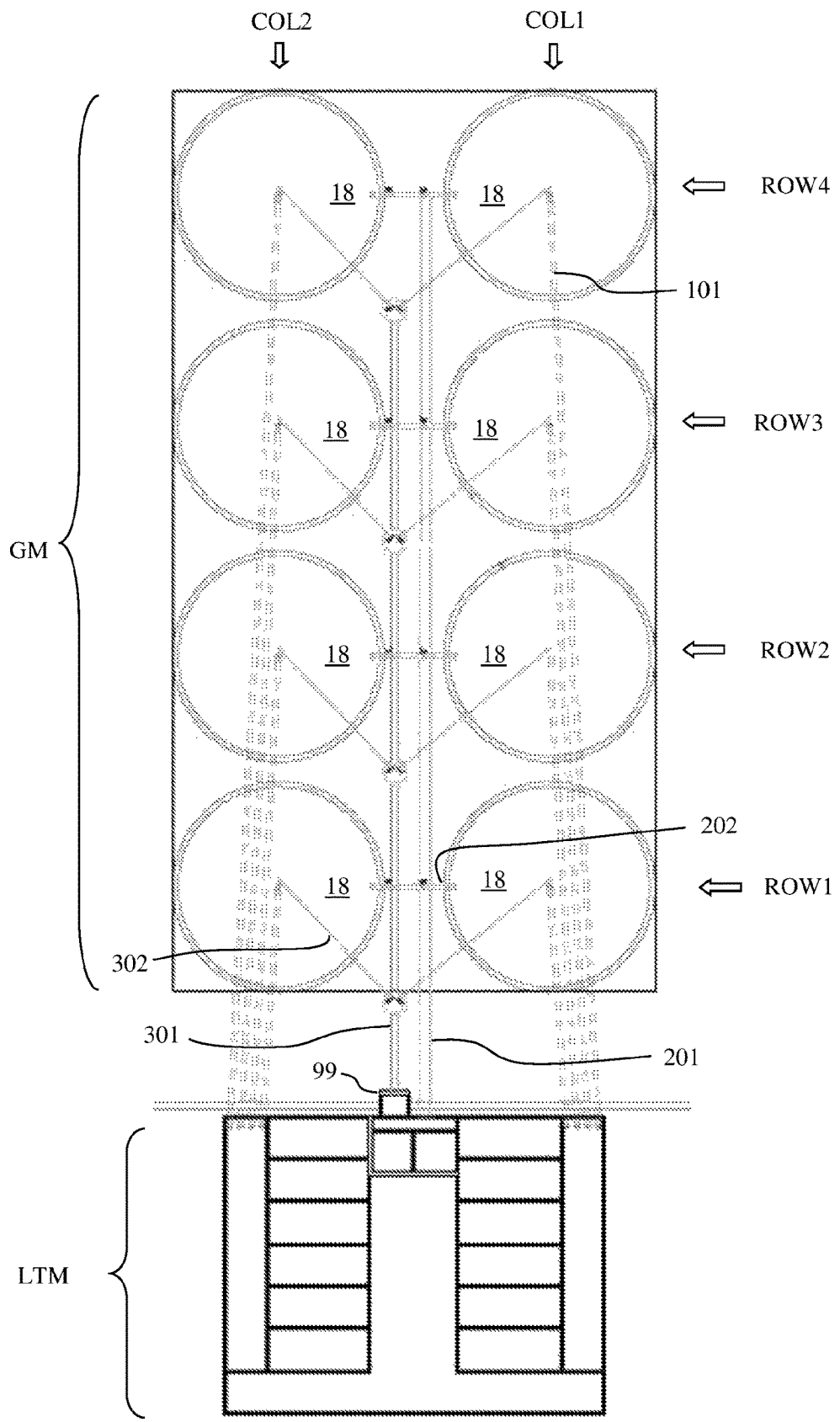
FIG. 3 schematically shows an embodiment of a growing module (GM) and an embodiment of a water treatment module (WTM) that is associated therewith.

Attention is drawn to FIG. 3 illustrating an embodiment of a growing module (GM) and an embodiment of a liquid treatment module (LTM) interconnected by a network of pipes. The growing module (GM) is here seen including ten growing tanks 18 forming a matrix comprising rows and columns of growing tanks. In this example the matrix is a two by four matrix, including in each row (here numbered ROW1 to ROW 4) two growing tanks 18 and in each column (here numbered COL1 and COL2) four growing tanks 18.

Each growing tank 18 is arranged in this example to directly discharge typically untreated liquid for treatment at the liquid treatment module (LTM) via an outgoing pipe 101 of the pipe network. Treated liquid after processing and treatment at the LTM can be circulated back towards growing tanks of the GM via a so-called called "fishbone" pipe configuration that in this example includes a main incoming pipe 201 extending here between the two columns C1, C2; which branches off to input treated liquid back into to each growing tank via a respective branch incoming pipe 202.

Thus, the outgoing pipes 101 and the incoming pipes 201, 202 of the pipe network in this embodiment are adapted to circulate liquid back and forth between the growing tanks 18 of the GM and the liquid treatment module (LTM).

The pipe network also includes a main discharge pipe 301 extending here also between the two columns C1, C2; that can receive liquid from each growing tank 18 via a branch discharge pipe 302. The discharge pipes can function in this example for flushing liquid out of the tanks if needed (e.g. for maintenance) or during harvesting of organisms within the growing tanks.

Figure 9:
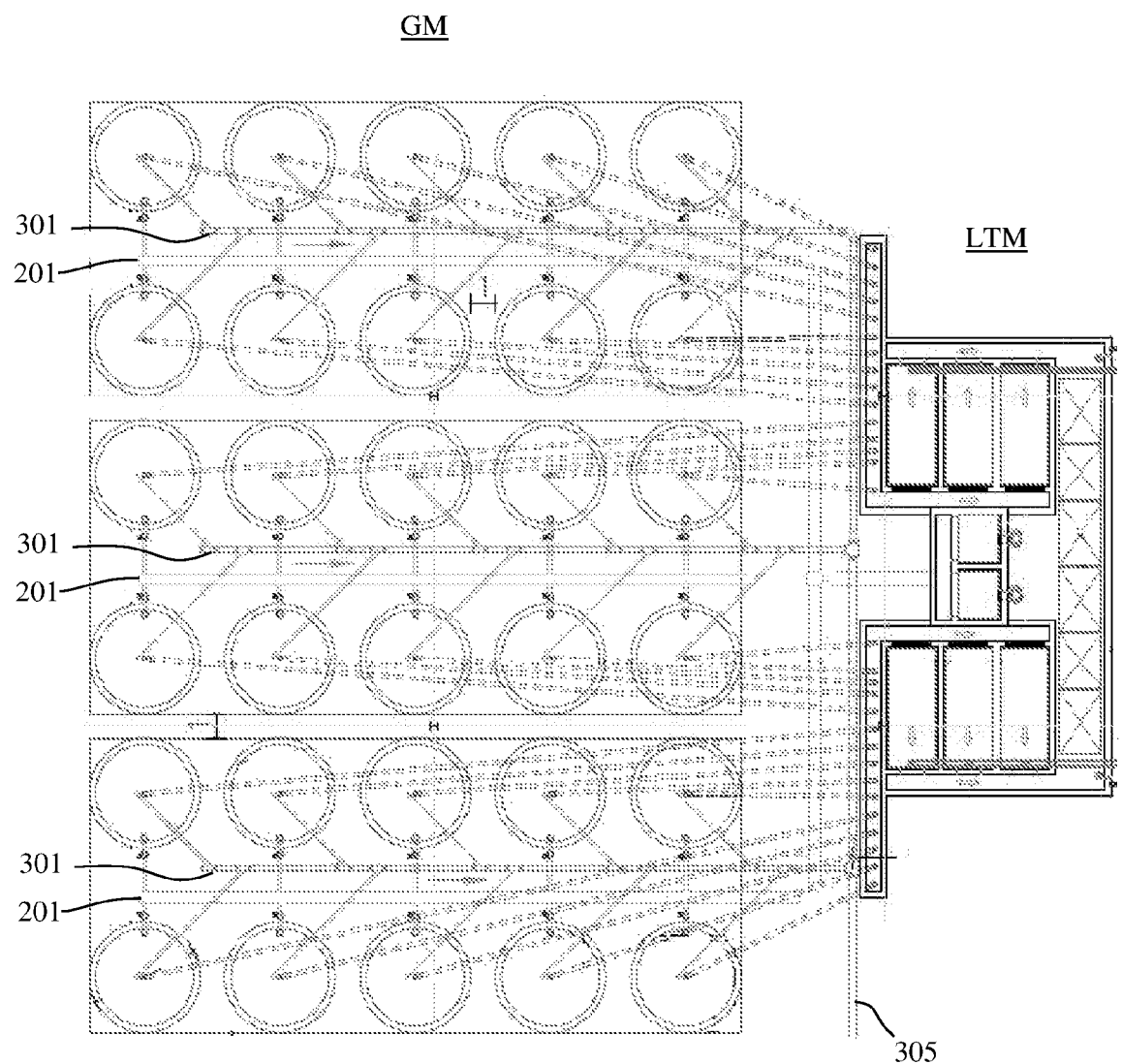
FIG. 9 schematically shows an embodiment of a growing module (GM) and an embodiment of a water treatment module (WTM) that is associated therewith.

In the example seen in FIG. 3, one main incoming pipe 201 and one main discharge pipe 301 can be in liquid communication with all growing tanks of the growing module (GM). In other embodiments (see, e.g., FIG. 9), several main incoming and discharge pipes 201, 301 may be used for communicating with all growing tanks of a growing module (GM) and for channeling liquids back and forth between such GM and an LTM that is paired therewith.

Figure 4:
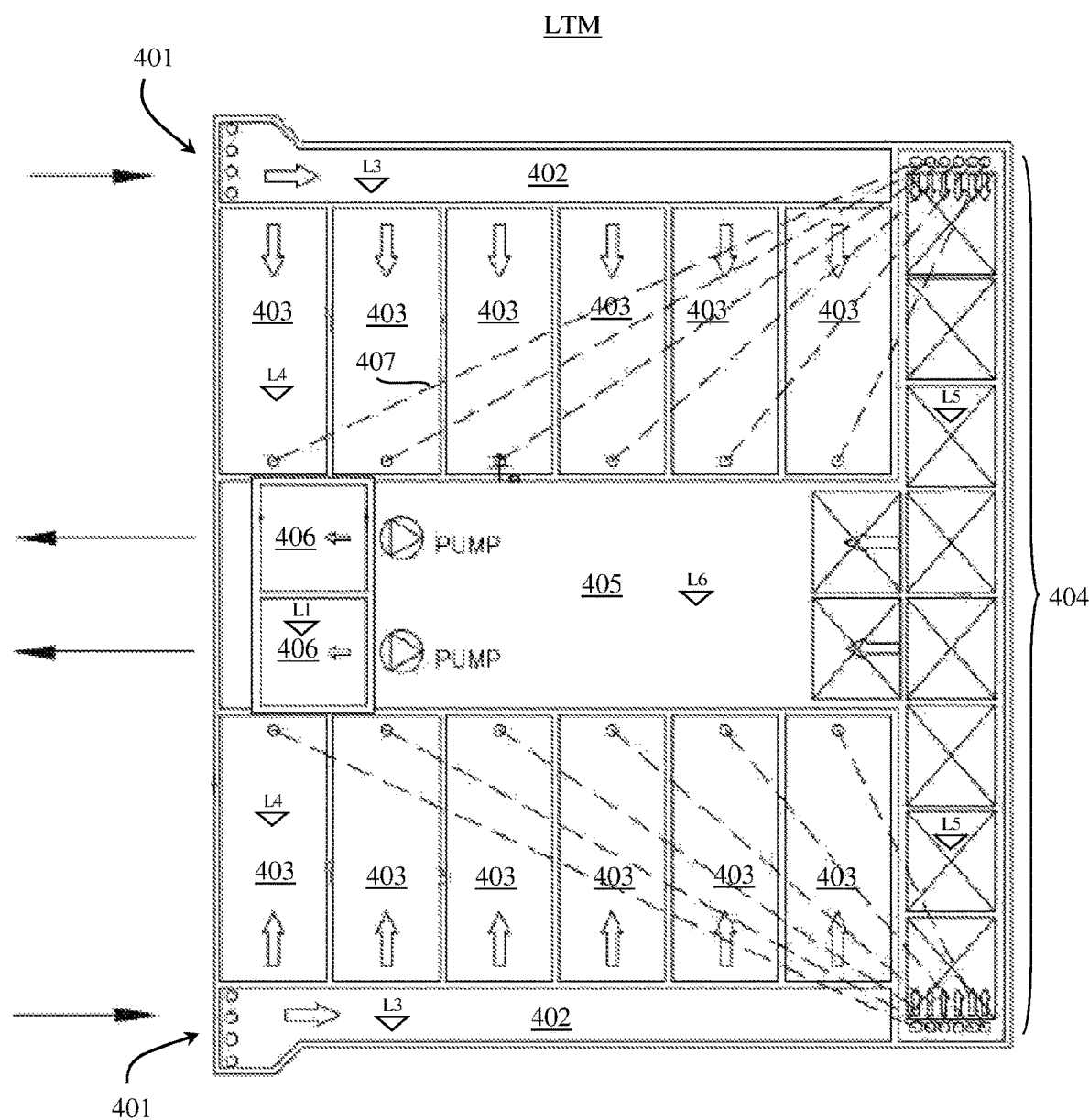
FIG. 4 schematically shows an embodiment of a liquid treatment module (LTM) generally similar to that shown in previous figures.

Attention is drawn to FIG. 4 illustrating an embodiment of a liquid treatment module (LTM), possibly such as that shown, inter alia, in FIG. 3. Incoming liquid arriving from the growing tanks of the GM via the outgoing pipes 101 of the pipe network are arranged in this example to enter the LTM via incoming gates 401 of the LTM that are located at outer lateral sides of the LTM relative e.g. to LTM's central terminal chamber 405 discussed herein below. The incoming liquid in this example then flows onwards into an incoming canal 402 to branch from there into basins 403 that may include bio-filter media (or the like).

From each basin 403 the liquid treated within the LTM can flow onwards downstream via linking pipes 407 to a degassing chamber 404 of the LTM that assists e.g. in removal of CO2 from the treated liquid flowing through the LTM. And from the degassing chamber the liquid flows downstream to a terminal chamber 405 of the LTM.

In an aspect of the present invention, the flow of liquid circulating between a GM and its associated LTM may be powered by gravitation for the majority of its route. For example, in an embodiment, the flow of liquid leaving each growing tank via the outgoing pipes 101; and flowing onwards downstream through the incoming canals 402, basins 403, and degassing chamber 404 of the LTM until reaching the LTM's terminal chamber 405 can be powered by gravitation.

In certain cases, the various aquaculture system embodiments disclosed herein may be suited to include or function with a denitrification (DNS) system (not shown) that may be used to remove substances such as $NO_3$ from water within such aquaculture systems. In one example, some of the water entering the degassing chamber 404 may be channeled to pass through a DNS to then be routed to return to the aquaculture system e.g. at its terminal chamber 405.

Liquid may be arranged to exit the LTM's terminal chamber 405 towards an outgoing oxidizing chamber 406 of the LTM via pumps that lift the liquid upwards to a level sufficient to flow onwards and outwards downstream away of the LTM via the incoming pipes 201, 202 of the pipe network back into the growing tanks. In the oxidizing chamber 406, introduction of oxygen into the liquid flowing back towards the growing tanks can be performed.

In certain cases, the introduction of oxygen into the oxidizing chamber 406 may be in form of Nanobubble Injection in order to improve and/or maintain oxygen enrichment in the water/liquid.

Such oxygen concentration ranges may be suited to assist in maintaining optimal water parameters of e.g. Ammonia, Nitrite, Nitrate, (and the like). In a non-binding example, Nanobubble Injection may be assisted by a Moleaer Neo Nanobubble Generator In tests performed by the inventors its was found that use of such Nanobubble may assist in purging the water that may e.g. avoid off flavour that may in some cases exist in salmon or the like grown in indoor automatic aquaculture systems.

Figure 5:
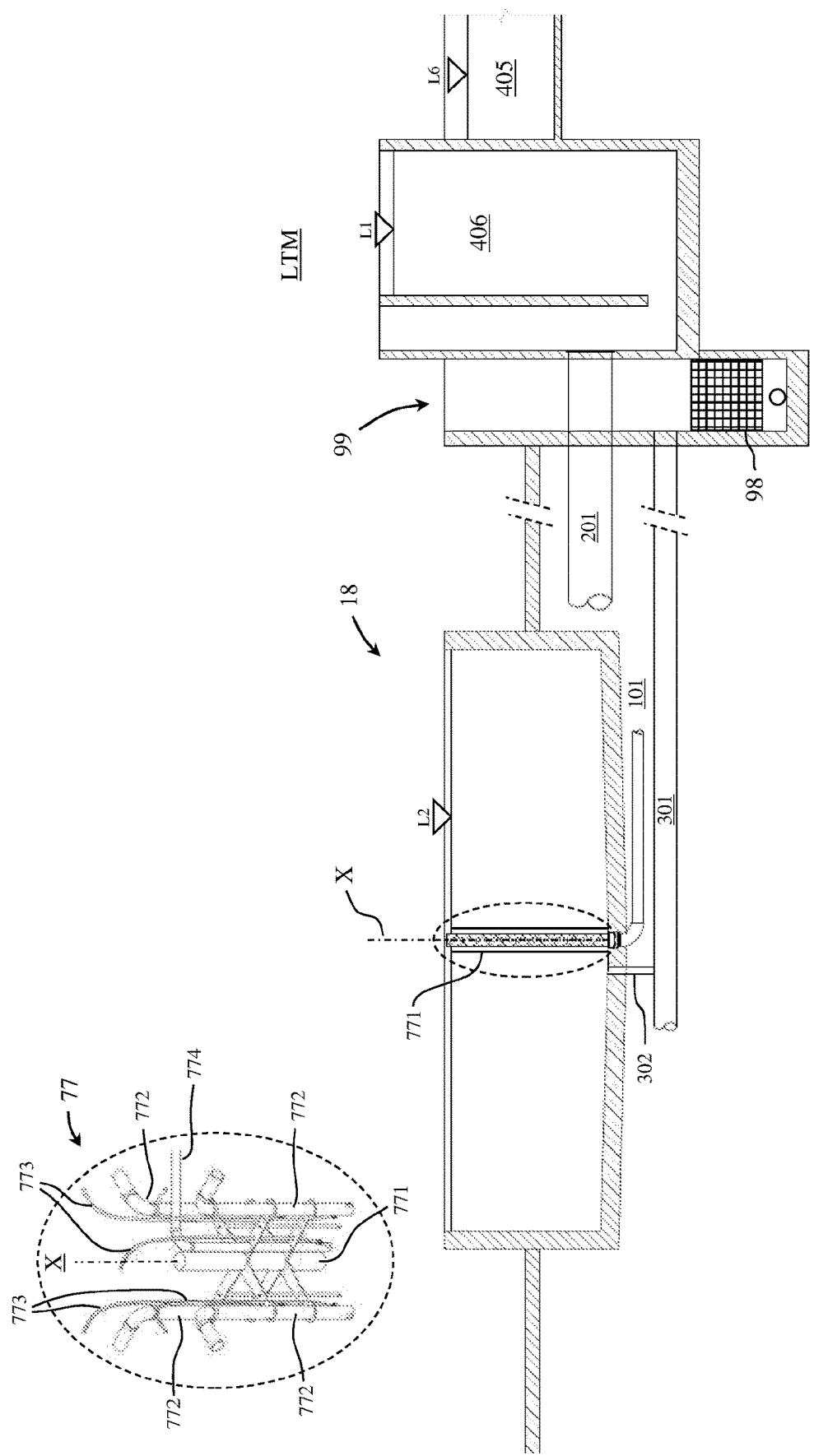
FIG. 5 schematically shows an embodiment of a growing tank and an embodiment of a liquid treatment module (LTM) and a network of pipes interconnecting them together.
Figure 6:
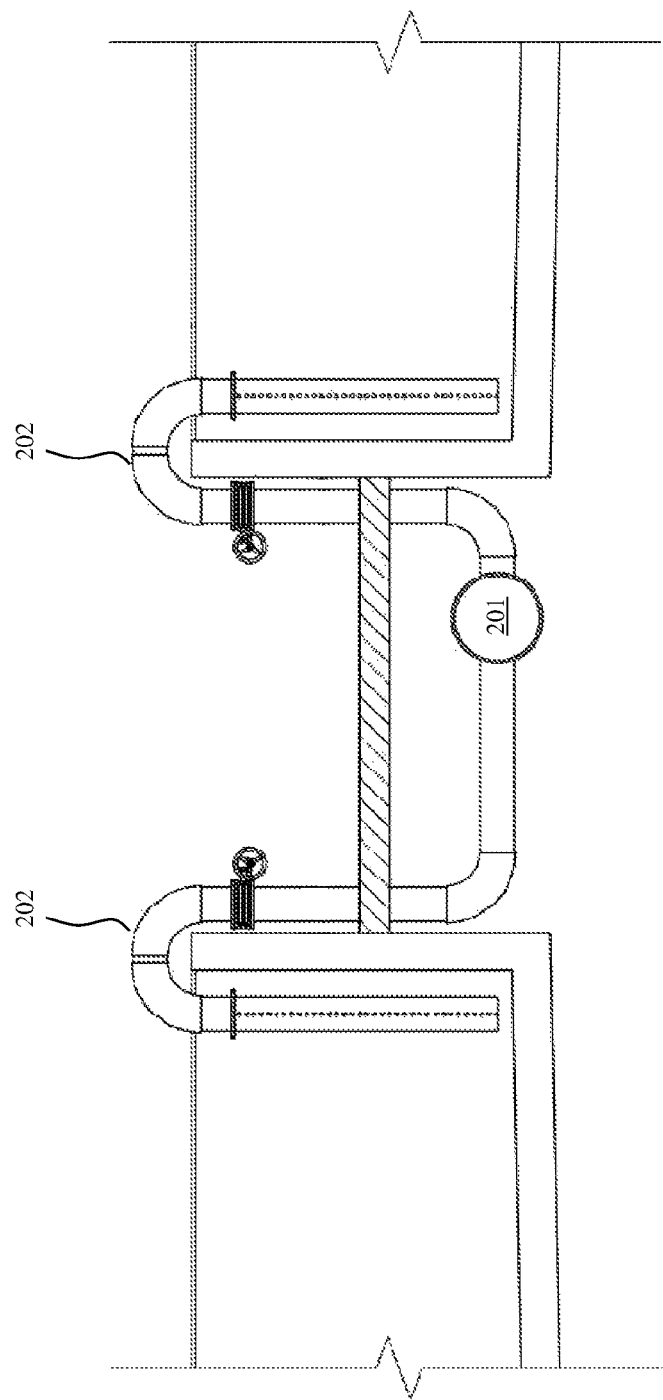
FIG. 6 schematically shows embodiments of two growing tank and incoming pipes of network of pipes.

Attention is drawn to FIG. 5 illustrating a cross sectional view through a given growing tank 18 and a liquid treatment module (LTM) suited for treating liquid of a growing module (GM) that includes such given growing tank and growing tanks generally similar thereto. The cross section of FIG. 6 illustrates a cross sectional view though two growing tanks.

The flow pattern of liquid within at least certain aquaculture system embodiments may be defined as generally fulfilling physics within a so-called 'communicating vessels' system. That is to say that if the liquid flowing within such aquaculture system would be left to settle, it would generally balance out to the same level in substantially most of the containers within the system regardless of their shape and volume.

Gravitational flow of liquid may be urged to occur between most vessels within the system, including portions of the LTM and growing tanks within the GM. This will now be described with reference also to liquid level markings provided in FIG. 4. The gravitational flow route of liquid may be arranged to start as illustrated in this example from the oxidizing chamber 406 of the LTM where the level of liquid L1 may be arranged to be the highest within this aquaculture system embodiment due to liquid being pumped and lifted to this lever from the terminal chamber 405 of the LTM.

From the oxidizing chamber 406 liquid flows outwards via the incoming pipes 201, 202 towards the growing tanks where the liquid assumes a level L2 that is lower than L1. The liquid may then be arranged to flow out of the growing tanks via the outgoing pipes 101 and into the LTM at the incoming canals 402 where the liquid level may be arranged to be slightly less than L2, i.e. L3. The level of liquid may then be arranged to drop to L4 at the basins 403, and L5 at the degassing chamber 404, and finally L6 within the terminal chamber 405 when the liquid level within this system is lowest.

By way of the non-binding example, L2 may be about 100 centimetres lower than L1, while from L2 the level of liquid may gradually drop through L3, L4, L5 until reaching level L6, which is about 35 centimetres less than L2. In other words, a maximal drop of about 100 centimetres in liquid level occurs in accordance with the non-binding example during transfer of liquid from oxidizing chamber 406 to the growing tank 18, while from growing tanks 18 the drop in level of liquid is more mild and amounts to about 35 centimetres until reaching terminal chamber 405 of the LTM.

FIG. 5 in its upper left-hand side illustrates an embodiments of a hub 77 that may be located at a central region of a growing tank 18. Hub 77 may include a drain pipe 771 extending generally along axis X. Drain pipe 771 may include axially spaced openings along it extension for collecting liquid from different levels within a growing tank and directing this liquid via an outgoing pipe 101 towards the LTM.

Hub 77 in addition may include several air lifting pipes 772 formed about the drain pipe. Each air lifting pipe 772 may extend up from an open end adjacent a floor of the growing tank to an upper end. The air lifting pipes may be arranged to lift substances such as sludge, dead organisms (or the like) from adjacent the tank's floor and discharge the lifted substances at an upper level of the growing tank. Such lifting of substances may be assisted by pressurized air that may be supplied towards lower ends of the air lifting pipes to assist in the lifting of the substances. Such pressurized air may be supplied via air pressure pipes 773 as illustrated in this figure.

Hub 77 may also include an evacuation pipe 774 (see also marked in FIG. 7A) for evacuating organism carcasses from adjacent the floor of the growing tank. Such evacuation may be assisted also via provision of pressured air to a lower side of the evacuation pipe 774. The organism carcasses may be evacuated to a side of the growing tank where they may be collected in a vessel (e.g. a netted vessel) for disposal.

In an aspect of the present invention, pressured air assisting in lifting and evacuating substances or dead shrimp carcass from the floor of a growing tank—may also assist in enriching liquid within growing tanks with oxygen.

Figure 2:
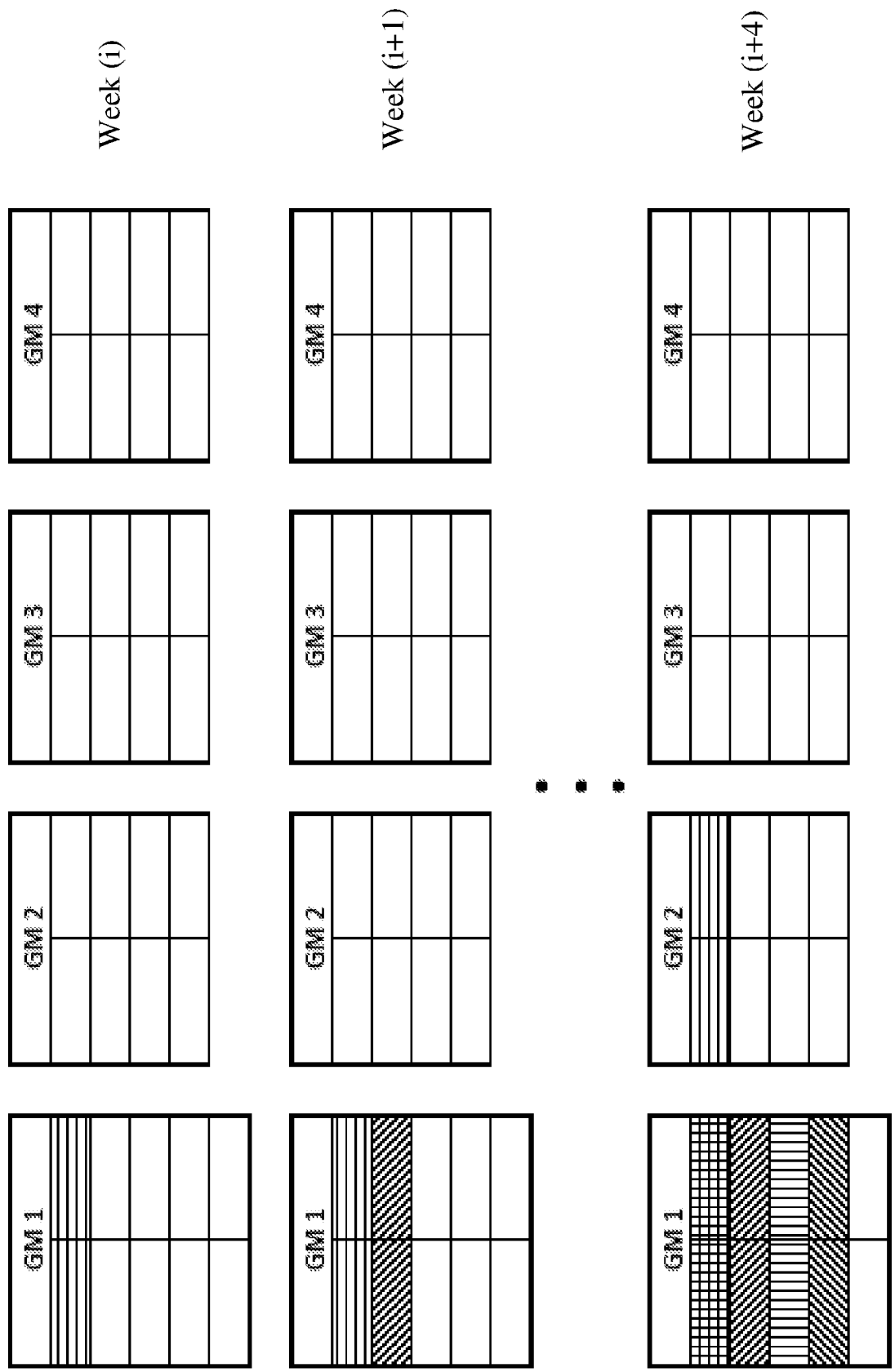
FIG. 2 schematically shows a diagram illustrating a possible populating scheme of growing tanks within growing modules (GM's) of a system such as that shown in FIG. 1.

Attention is drawn to FIG. 2 schematically illustrating aquaculture system generally similar to that e.g. shown in FIG. 1 during an optional time span of several weeks (here about four weeks, i.e. from week (i) to week (i+4)). GM1 according to the examples shown herein above may be arranged to house a second phase of growth for organisms arriving possibly from a nursery of the system.

In this example, populating organisms within the growing tanks of GM1 may be by placing each time an arriving batch of organisms within growing tanks of a certain row of the growing module. In the example, in week (i) the two growing tanks in the row most proximal to the LTM are first populated as indicated by the horizontal extending lines sketched in this row.

In the following week (i+1) the growing tanks in the adjacent row of GM1 are populated and so on until week (i+4) where four rows of growing tanks are populated with organisms of different growth stage, while the most advanced organisms that were first entered into ROW1 of GM1 have meanwhile been transferred into GM2 where they may remain until harvesting.

Figure 8:
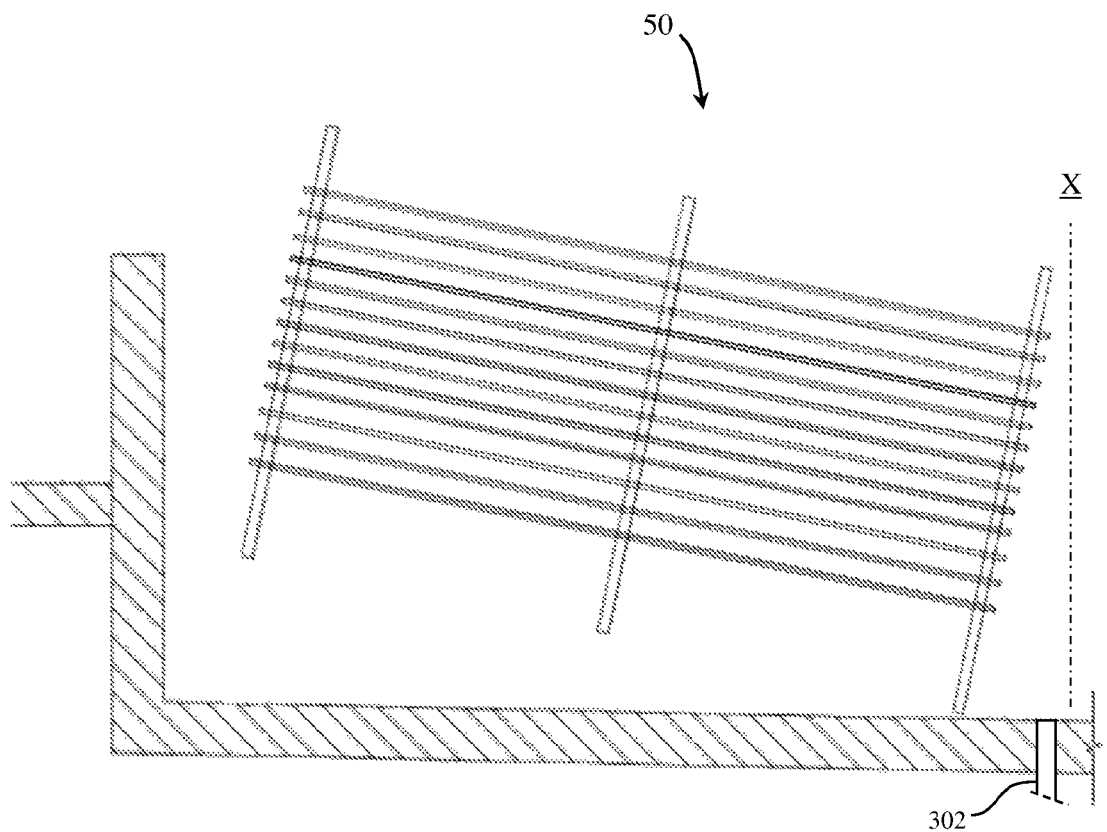
FIG. 8 schematically shows an embodiment of a vertical growing stack during a harvesting stage.

Attention is drawn to FIG. 8 to demonstrate an aspect of the present invention relating to the harvesting of organisms. In accordance with an embodiment of the present invention, harvesting of organisms may be assisted by urging movement in growing stacks within a growing tank housing organisms ready for harvesting.

In the illustrated example, such movement is demonstrated by urging a growing stack to tilt a position where its shelves are in a slanted orientation relative to the growing tank's central axis X. In such tilted orientation, mature organisms occupying the shelves of the growing stack are arranged to slip and move towards the discharge pipe 302 of the growing tank that is located generally close to the growing tank's center. Through discharge pipe 302 the organisms may be communicated downstream for harvesting.

In an embodiment of the present invention, harvesting of organisms may include opening a valve controlling flow through a discharge pipe 302 associated with a given growing tank where harvesting is taking place.

Harvesting may be performed in certain embodiments, by tilting each time only a single growing stack within a given growing tank. In certain embodiments, each growing stack being tilted to harvest the organisms therein, may remain tilted so that organisms will not re-occupy it, while other growing stacks within the growing tank are subsequently tilted one after the other to complete a harvesting cycle of the given growing tank.

Tilting of growing stacks may be assisted by tilting members (not shown) located within a growing stack. In certain cases, tilting may be performed by external tilting members, such as a crane (or the like).

Organisms being harvested from a certain growing tank may accordingly flow via the discharge pipe 302 associated with the growing tank and then onwards downstream via the main discharge pipe 301. Main discharge pipe 301 may lead in the shown example in the figures, to a service reservoir (or harvesting pit) 99 located adjacent the LTM associated with the growing tank being harvested (see service reservoir (or harvesting pit) 99 marked in FIGS. 3 and 5).

As seen in the cross section of FIG. 5, a perforated basket 98 may be placed below an entry point of main discharge pipe 301 into service reservoir 99. In this way, the liquid transporting the harvested organisms out of the growing tank can flow through the perforations in the basket while the leaving the harvested organisms behind in basket 98.

Figure 10:
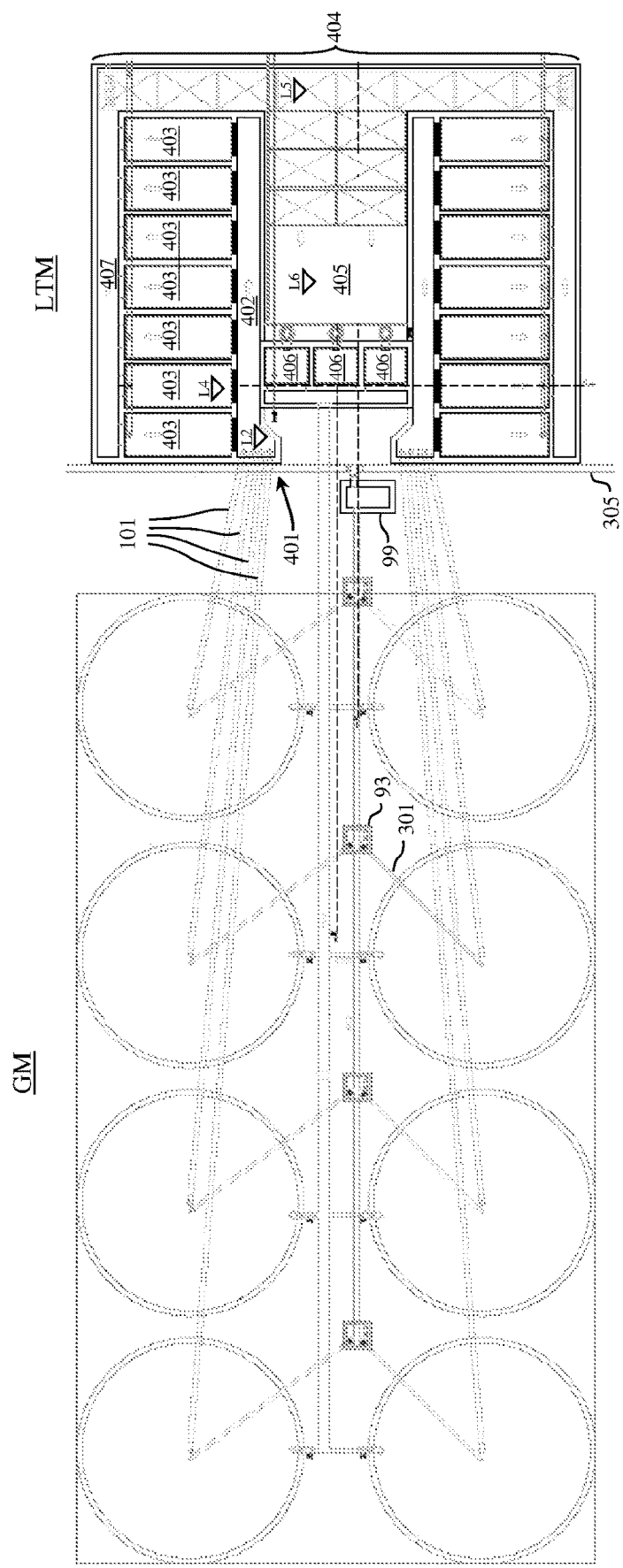
FIG. 10 schematically shows another embodiment of a growing module (GM) and another embodiment of a water treatment module (WTM) that is associated therewith.
Figure 11:
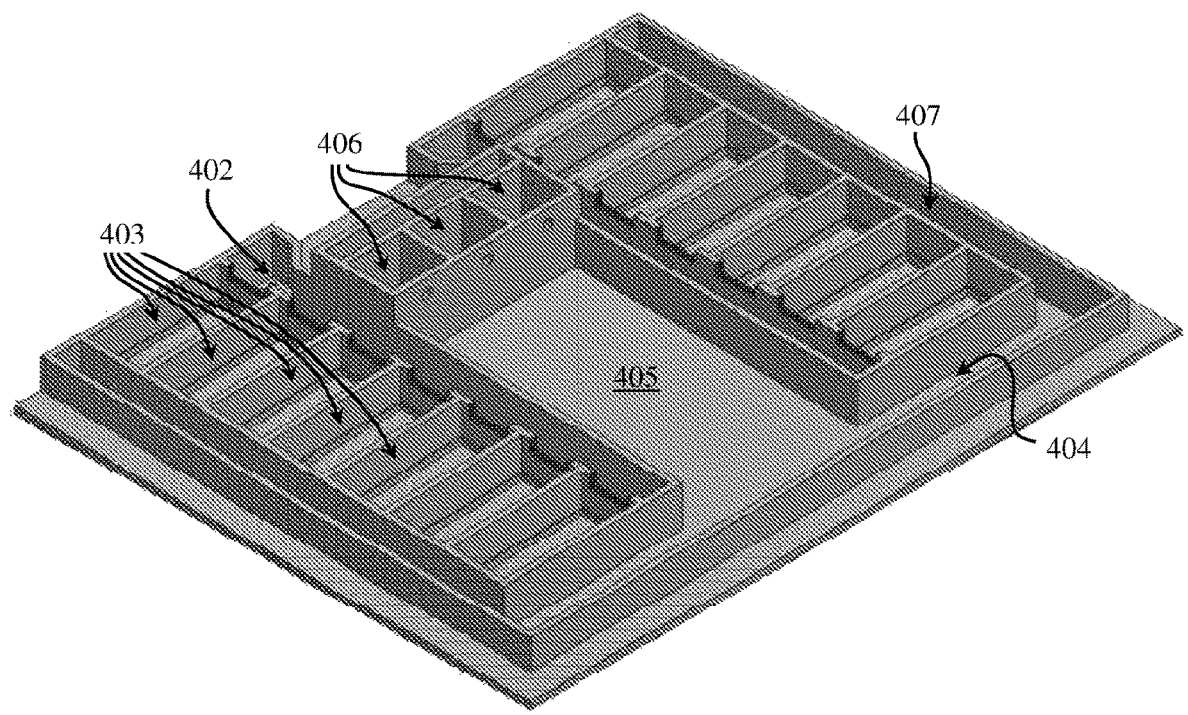
FIG. 11 schematically shows an enlarged perspective view of the water treatment module (WTM) of FIG. 10.

Attention is drawn to FIG. 10 illustrating an embodiment of a growing module (GM) and an embodiment of a liquid treatment module (LTM) interconnected by a network of pipes. With attention additionally drawn to FIG. 11, a closer view of portions of the liquid treatment module (LTM) of this embodiment can be seen.

Incoming liquid arriving from the growing tanks of the GM via the outgoing pipes 101 of the pipe network are arranged in this example to enter the LTM via incoming gates 401 of the LTM that in this example arrive at a more central location of the LTM relative to the LTM embodiment seen in FIGS. 3 and 4.

The incoming liquid then flows onwards into an incoming canal 402 to branch from there laterally outwards into basins 403 that may include bio-filter media (or the like).

From each basin 403 the liquid treated within the LTM can flow onwards downstream to a degassing chamber 404 of the LTM in this example via a linking channel 407 (possibly open channel) that collects liquid exiting all the basins 403. The degassing chamber 404 assists e.g. in removal of $CO_2$ from the treated liquid flowing through the LTM. From the degassing chamber the liquid flows downstream to a terminal chamber 405 of the LTM.

In an aspect of the present invention, the flow of liquid circulating between a GM and its associated LTM may be powered by gravitation for the majority of its route. For example, in an embodiment, the flow of liquid leaving each growing tank via the outgoing pipes 101; and flowing onwards downstream through the incoming canals 402, basins 403, linking channel 407 and degassing chamber 404 of the LTM until reaching the LTM's terminal chamber 405 can be powered by gravitation.

Liquid may be arranged to exit the LTM's terminal chamber 405 towards an outgoing oxidizing chamber 406 of the LTM via pumps that lift the liquid upwards to a level sufficient to flow onwards and outwards downstream away of the LTM via the incoming pipes 201, 202 of the pipe network back into the growing tanks. In the oxidizing chamber 406, introduction of oxygen into the liquid flowing back towards the growing tanks can be performed.

Figure 12:
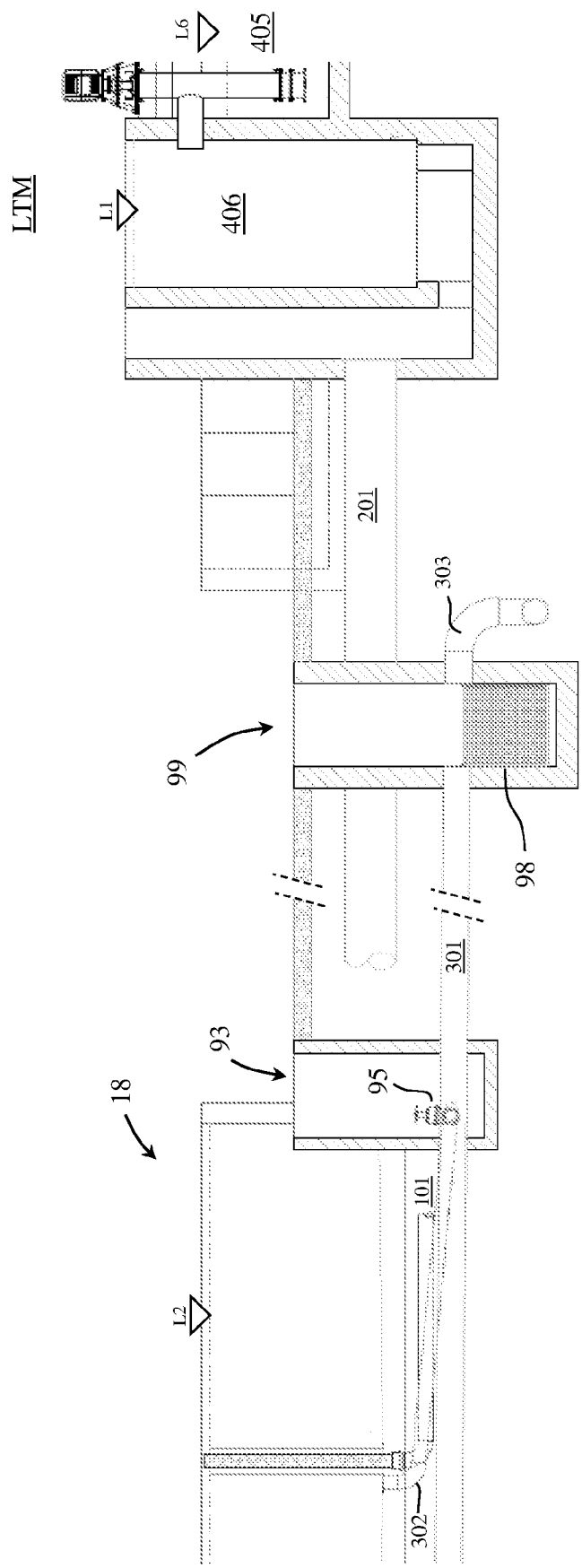
FIG. 12 schematically shows an embodiment of a growing tank and an embodiment of a liquid treatment module (LTM) and a network of pipes interconnecting them together.

Attention is drawn to FIG. 12 illustrating a cross sectional view through a given growing tank 18 and a liquid treatment module (LTM) suited for treating liquid of a growing module (GM) that includes such given growing tank and growing tanks generally similar thereto.

The flow pattern of liquid within at least certain aquaculture system embodiments may be defined as generally fulfilling physics within a so-called 'communicating vessels' system. That is to say that if the liquid flowing within such aquaculture system would be left to settle, it would generally balance out to the same level in substantially most of the containers within the system regardless of their shape and volume.

Gravitational flow of liquid may be urged to occur between most vessels within the system, including portions of the LTM and growing tanks within the GM. This will now be described with reference also to liquid level markings provided in FIG. 11. The gravitational flow route of liquid may be arranged to start as illustrated in this example from the oxidizing chamber 406 of the LTM where the level of liquid L1 may be arranged to be the highest within this aquaculture system embodiment due to liquid being pumped and lifted to this lever from the terminal chamber 405 of the LTM.

From the oxidizing chamber 406 liquid flows outwards via the incoming pipes 201, 202 (see pipes 202 in FIG. 6) towards the growing tanks where the liquid assumes a level L2 that is lower than L1. The liquid may then be arranged to flow out of the growing tanks via the outgoing pipes 101 and into the LTM at the incoming canals 402 where the liquid level may be arranged to be slightly less than L2, i.e. L3. The level of liquid may then be arranged to drop to L4 at the basins 403, and L5 at the degassing chamber 404, and finally L6 within the terminal chamber 405 when the liquid level within this system is lowest.

By way of the non-binding example, L2 may be about 100 centimetres lower than L1, while from L2 the level of liquid may gradually drop through L3, L4, L5 until reaching level L6, which is about 35 centimetres less than L2. In other words, a maximal drop of about 100 centimetres in liquid level occurs in accordance with the non-binding example during transfer of liquid from oxidizing chamber 406 to the growing tank 18, while from growing tanks 18 the drop in level of liquid is more mild and amounts to about 35 centimetres until reaching terminal chamber 405 of the LTM.

Organisms being harvested from a certain growing tank may flow via the discharge pipe 302 associated with the growing tank and then onwards downstream via the main discharge pipe 301. In this example, a service reservoir 93 may be used for obtaining easy access to a valve 95 that controls downstream flow from the discharge pipe 302 into main discharge pipe 301. Main discharge pipe 301 may lead in the shown example in the figures, to a service reservoir (or harvesting pit) 99 where a perforated basket 98 may be placed for capturing harvested organisms arriving via main discharge pipe 301.

Figure 13A:
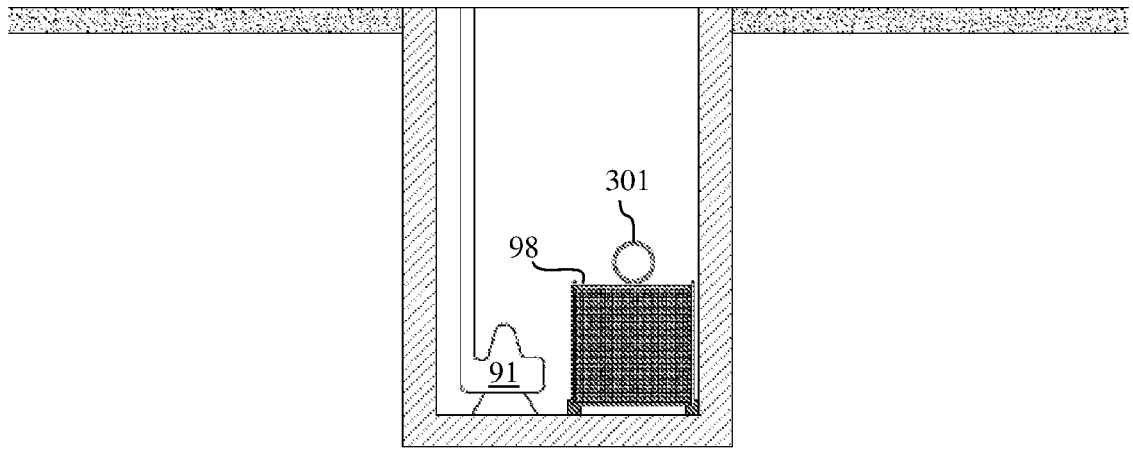
FIGS. 13A and 13B schematically show cross sectional views of a reservoir or harvesting pit with a perforated basket for capturing organisms being harvested from growing tanks within an aquaculture system in accordance with an embodiment of the present invention.
Figure 13B:
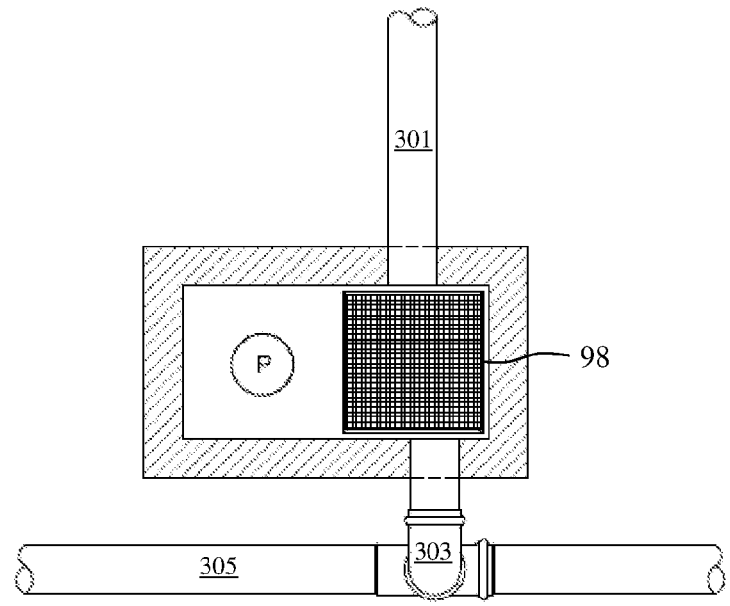

As seen in the cross sections of FIGS. 13A and 13B, the perforated basket 98 may be placed below an entry point of main discharge pipe 301 into service reservoir 99. In this way, the liquid transporting the harvested organisms out of the growing tank can flow through the perforations in the basket while the leaving the harvested organisms behind in basket 98.

Excess water may be evacuated downstream via a secondary drain pipe 303 associated with each reservoir 99 that channels liquid downstream towards a primary drain pipe 303 that can collects water/liquid drained out from all the reservoirs 99. A pump 91 located within each service reservoir 99 may be used to for evacuating excess water out of the reservoir and thereby for regulating the level of water within the reservoir.

Figure 14:
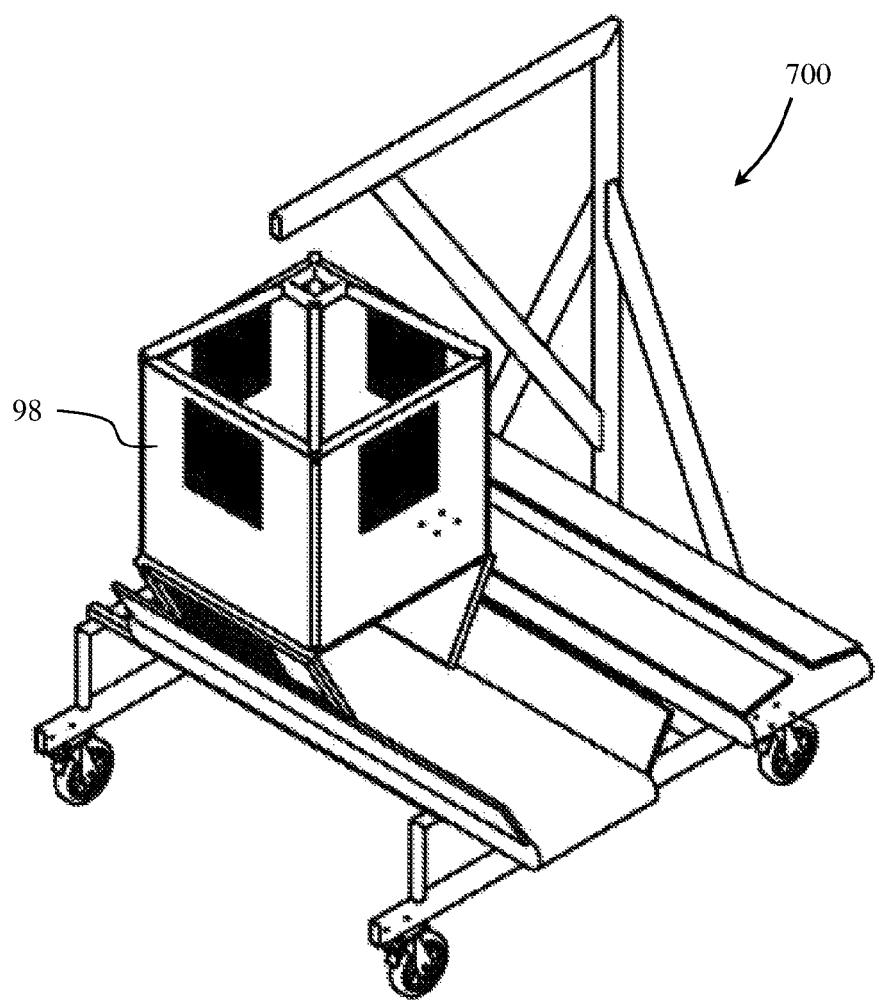
FIG. 14 schematically shows an embodiment of a service wagon for lifting a basket such as that in FIG. 13 or former Figs. from a harvesting pit.

Attention is drawn to FIG. 14 showing a possible service wagon 700 that may be used in at least certain aquaculture system embodiments for lifting a basket 98 from a harvesting pit 99 in order to preferably enable rapid evacuation of harvested organisms, such as shrimp, to a packing house (not shown).

Possibly, the service wagon 700 after lifting can position the basket 98 above a conveyor (or the like) for dispensing the harvested organisms to or towards the packing house, where on said conveyor or thereafter—the harvested organisms released from the basket may be surged within ice.

In an aspect of the present invention, a water salting system and method may be provided that can be useful in certain conditions e.g. where access to saline water with a salt concertation suitable for organism growth may not be sufficiently available.

It is noted that such water salinization system and method may be applicable also to aquaculture systems in general and not necessarily only to the aquaculture system embodiments disclosed herein.

A water salting system and method according to the present disclosure may be tuned to produce different salinity values for different GM's or growing tanks e.g. according to the growth stage of organisms being farmed therein.

Figure 15A:
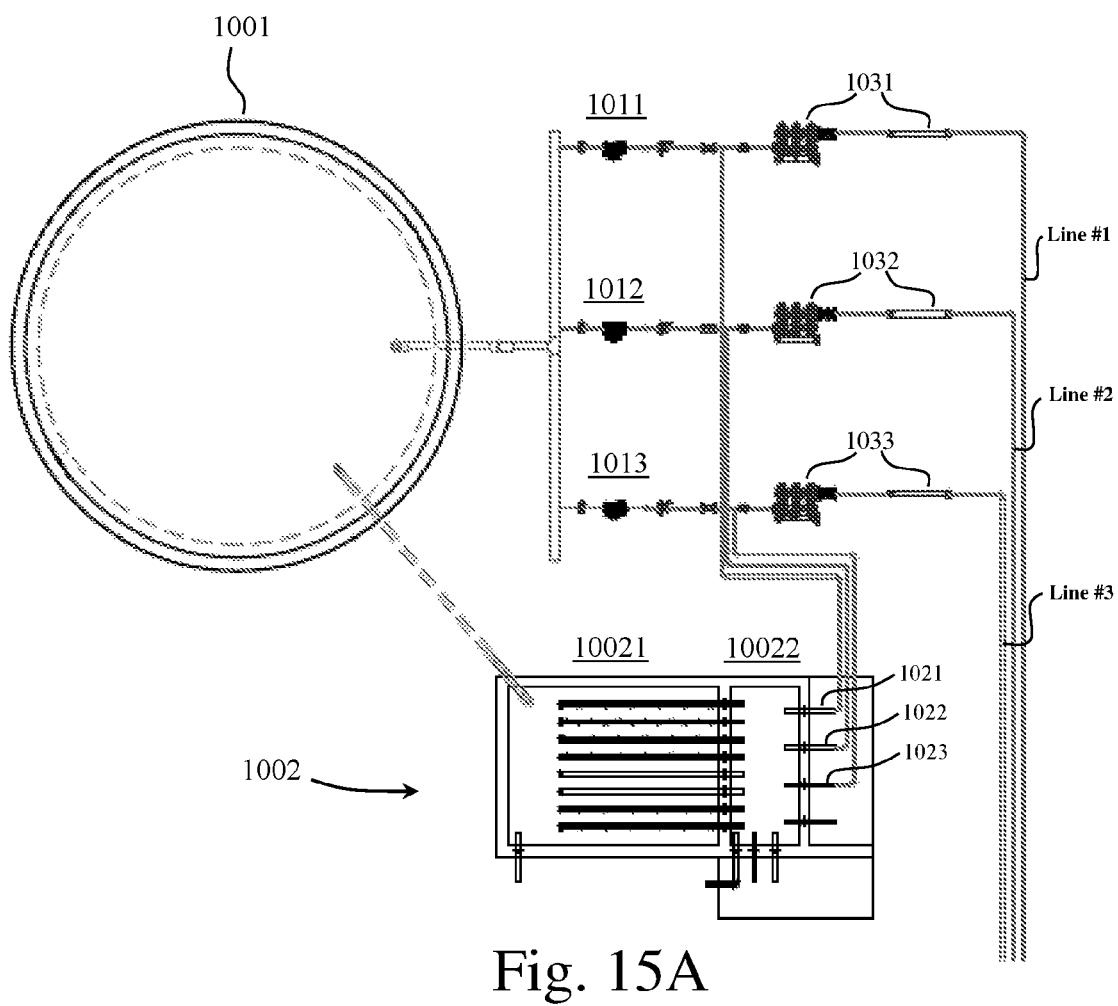
FIGS. 15A and 15B schematically show, respectively, a water salting system and process for possibly providing different salinity values in different GM's or growing tanks of an aquaculture system in accordance with an embodiment of the present invention.
Figure 15B:
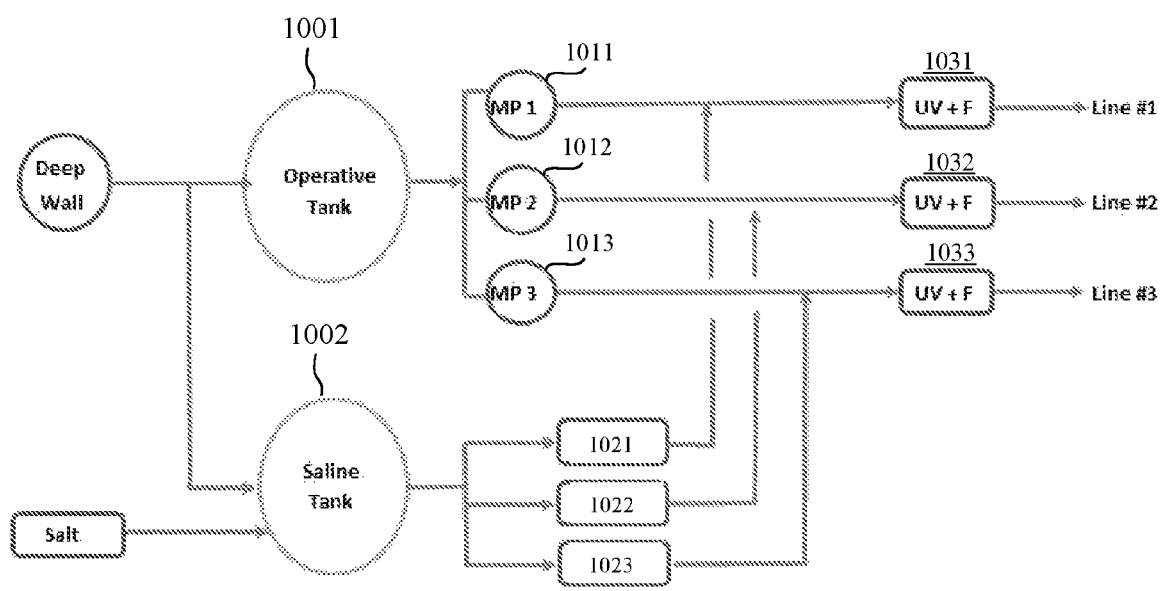

Attention is drawn to FIGS. 15A and 15B showing a system and method for water salinization. The salinization system in this example includes an operative tank 1001 for storing water available at the site where the aquaculture system is located, and a saline tank 1002 that stores water having a relative high salt concentration.

Saline tank 1002 as seen may be designed to include first and second sections 10021, 10022. First section 10021 in this example may be used for receiving salt and may include devices for assisting in the mixing of the salt with the water, such as one or more perforated pipes injecting gaseous into the water, mechanical mixers (or the like).

Salinized water arriving at section 10022 may be distributed downstream via one or more dosing pumps 1021, 1022, 1023; depending on the number of levels of salinized water that the salinization system is designed to output towards the aquaculture system via outgoing lines, in this example three such outgoing lines #1, #2, #3.

The operative tank 1001 is arranged to output water downstream via one or more module pumps 1011, 1012, 1013, and each such water stream that is urged downstream is arranged to merge with a corresponding salinized water stream arriving from saline tank 1002 and possibly undergo after merging a process of UV exposure and filtration at a station 1031.

The salt concertation in each one of the salinized water streams that is urged downstream by the dosing pumps 1021, 1022, 1023—when merging with the water urged downstream from the operative tank by each one of the module pumps 1011, 1012, 1013—results in outgoing salinized water lines (in this example accordingly #1, #2, #3) that can be channelled towards the aquaculture system.

In the aquaculture system embodiments of the present invention—a salinized water line (e.g. #1) with relative high salt concentration generally similar to salt conditions in the natural growing conditions where the organisms typically grow—may be channelled towards the nursery section of the system.

In cases where more mature organisms can be grown in less salty conditions, salinized water lines with lower concentrations of salt can be used to channel salinized water to those sections within the aquaculture system where the more mature organisms are farmed.

For example, a salinized water line (e.g. #2) with a lower salt concentration than that channeled to the nursery section (e.g. #1)—may be channeled towards the first segment 161 of the farming section 16, and a salinized water line (e.g. #3) with yet a lower salt concentration—may be channeled towards the second segment 162 of the farming section 16.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A method for growing organisms comprising the steps of:
   providing an aquaculture system comprising growing modules (GM's) and liquid treatment modules (LTM's), each GM being associated via a network of pipes with a respective LTM to form a pair, wherein if liquid flow through a given pair is stopped and left to settle, liquid within the given pair is arranged to balance out to the same level, wherein
   an LTM comprises a plurality of chambers for treating liquid and at least one pump for pumping liquid from a terminal chamber of the LTM to an outgoing chamber of the LTM to form a liquid level difference between these two chambers that urges liquid to flow away from the LTM towards its associated GM and back from the GM towards the LTM, wherein
   liquid flow within a given pair is powered by gravitational force from the outgoing chamber of the LTM towards the GM and back towards the terminal chamber of the LTM, and wherein
   during liquid flow within a given pair of a GM and an LTM, a drop in liquid level between the outgoing chamber of the LTM and a growing tank in the GM is substantially greater than a drop in liquid level between the growing tank and the terminal chamber of the LTM.

2. The method of claim 1, wherein during operation of the system in each pair liquid is arranged to circulate between the GM and the LTM to be treated in the LTM.

3. The method of claim 2, wherein treatment of liquid in an LTM comprises any one of: degassing, oxidizing and/or bio-filtering.

4. The method of claim 1, wherein liquid arriving from an LTM and entering into each growing tank of a GM it is paired with is arranged to enter each such growing tank via a respective incoming pipe, and wherein the incoming pipe is arranged to distribute the incoming liquid along a height of each growing tank of the GM.

5. The method of claim 1, wherein the flow path of liquid between the growing tank and the terminal chamber of the LTM comprises a flow path that passes through the plurality of chambers of the LTM.

6. The method of claim 1 and comprising a water salinization system for providing salinized water to different sections within the aquaculture system where organisms are grown, wherein the water salinization system is arranged to provide salinized water at different salt concentrations to different sections of the aquaculture system according to a general growth stage of the organisms in each such section.

7. The method of claim 1, wherein each GM comprises a plurality of growing tanks.

8. The method of claim 7, wherein growing tanks of a GM are arranged in a matrix comprising rows and columns of growing tanks.

9. The method of claim 8, wherein the network of pipes interconnecting a GM and an LTM of a given pair comprises main incoming and discharge pipes extending in between columns of the GM.

10. The method of claim 9, wherein a main incoming pipe communicates liquid from the LTM towards growing tanks of the GM and/or a main discharge pipe communicates liquid outwards from growing tanks of the GM during harvesting of crustaceans.

11. The method of claim 7, wherein in at least one pair of a GM and an LTM, at least some growing tanks of the GM comprise each a plurality of vertical growing stacks providing vertical shelves for growth of crustaceans.

12. The method of claim 11, wherein growing stacks are tiltable relative to a growing tank where they are housed.

13. The method of claim 11, wherein shelves in growing stacks comprise apertures for providing liquid flow between the shelves.

14. The method of claim 11, wherein growing stacks are symmetrically distributed about a central axis of the growing tank where they are housed.

15. The method of claim 14, wherein at least some of the growing tanks comprise a central hub formed about a central axis of the growing tank.

16. The method of claim 15, wherein a central hub comprises several pipes for servicing a growing tank where it is located, wherein servicing a growing tank comprises air lifting substances from adjacent a floor of the growing tank.

17. The method of claim 16, wherein servicing a growing tank comprises draining liquid out of the growing tank towards an LTM treating the liquid circulating out of the growing tank.

18. A method for growing crustaceans comprising the steps of:
   providing an aquaculture system comprising a farming section, the farming section comprises growing modules (GM's) and liquid treatment modules (LTM's), wherein each GM being associated via a network of pipes with a respective LTM to form a pair,
   housing crustaceans within at least some of the GM's until reaching a mature stage where they are harvested, wherein
   harvesting comprises urging movement of growing stacks within at least some of the GM's wherein each growing stack comprises a plurality of vertical shelves, wherein each growing tank where harvesting occurs comprises a plurality of growing stacks, wherein movement of a growing stack is from an initial non-moved state to a terminal moved state, and wherein growing stacks within a growing tank are distributed in a symmetrical manner about a central axis X of the growing tank, and each growing tank comprises a discharge pipe located generally close to its central axis X, and wherein movement of a growing stack comprises tilting of the growing stack towards the discharge pipe.

19. The method of claim 18, wherein harvesting comprises evacuating liquid comprising harvested crustaceans via a discharge pipe in liquid communication with a growing tank where harvesting occurs.

20. An aquaculture system comprising growing modules (GM's) and liquid treatment modules (LTM's), each GM being associated via a network of pipes with a respective LTM to form a pair, wherein if liquid flow through a given pair is stopped and left to settle, liquid within the given pair is arranged to balance out to the same level, wherein the system further comprising a water salinization system for providing salinized water to different sections within the aquaculture system where organisms are grown, wherein the water salinization system is arranged to provide salinized water at different salt concentrations to different sections of the aquaculture system according to a general growth stage of the organisms in each such section, and wherein the water salinization system comprises an operative tank storing water available at the site where the aquaculture system is located and a saline tank comprising salinized water at a higher concertation level of salt than that in the water in the operative tank, and the providing of salinized water at different salt concentrations to different sections of the aquaculture system comprises merging together water arriving from the operative tank with salinized water arriving from the saline tank.

* * * * *